July 17, 1956

R. H. KHOLUCY 2,754,654

STARTING OF INTERNAL-COMBUSTION-OPERATED
FREE-PISTON ENGINES

Filed Dec. 16, 1952

INVENTOR
Ralph Hamed Kholucy
BY
ATTORNEYS

INVENTOR
Ralph Hamed Kholucy
BY
ATTORNEYS

July 17, 1956

R. H. KHOLUCY

2,754,654

STARTING OF INTERNAL-COMBUSTION-OPERATED
FREE-PISTON ENGINES

Filed Dec. 16, 1952

INVENTOR
Ralph Hamed Kholucy
BY
ATTORNEYS

July 17, 1956

R. H. KHOLUCY 2,754,654

STARTING OF INTERNAL-COMBUSTION-OPERATED
FREE-PISTON ENGINES

Filed Dec. 16, 1952

INVENTOR
Ralph Hamed Kholucy
BY
*[signature]*
ATTORNEYS

Fig. 17.

United States Patent Office 2,754,654
Patented July 17, 1956

2,754,654

STARTING OF INTERNAL-COMBUSTION-OPERATED FREE-PISTON ENGINES

Ralph Hamed Kholucy, Hounslow, England, assignor to Alan Muntz & Company Limited, Hounslow, England, a British company Application December 16, 1952, Serial No. 326,179

Claims priority, application Great Britain December 28, 1951

13 Claims. (Cl. 60—14)

This invention relates to internal-combustion-operated air-compressors and gas-generators of the free-piston type, having a pair of opposed free pistons arranged to operate in a common motor cylinder on a two-stroke compression ignition cycle and rigidly connected by two piston rods respectively to two further pistons, at least one of which further pistons is a compressor piston operating in a compressor cylinder and serving for scavenging the internal combustion cylinder as well as for delivering air under pressure, the said pair of opposed free pistons being connected by an oscillating link and lever system in order to ensure synchronism in their movements.

A free-piston machine of the above mentioned type is commonly provided with means whereby a pneumatic cushion is afforded which takes energy from the piston assembly during the power stroke thereof (i. e., the stroke during which the motor pistons move away from one another) and returns it to the piston assembly in order to effect the compression stroke. The cushion space is commonly provided by the use of a piston assembly of which the piston rod between the head of one of the motor pistons and the related compressor piston is hollow and open at the end towards the outer end wall of the compressor chamber, and a fixed cylindrical body extending from the end wall of the compressor chamber of other suitable anchorage into said hollow piston rod. During a normal power stroke of the machine air is compressed between the end of the hollow cushion space in the piston rod and the end of the fixed cylindrical body, and the cushion of air thereby produced effects the compression stroke of the piston assembly.

Such a free-piston machine is started by setting the free-piston assembly at or near the limit of its power stroke and then producing a starting stroke by accelerating the motor pistons towards one another to compress an air charge in the motor cylinder, and provided the fuel injection system delivers a charge of fuel into the combustion chamber of the motor cylinder towards the end of this starting stroke combustion will take place and the machine will continue to run. The starting stroke of the piston assembly, after the latter has first been manoeuvred to the position at or near to the limit of its power stroke, may be effected by the sudden release of a quantity of compressed air into the cushion space from a valve-controlled starting chamber, usually constituted by the above-described fixed cylindrical body, which in such case is formed hollow. Movement of the piston assembly to the position at or near the end of its power stroke is effected by means of a manoeuvring gear comprising a cylinder containing a piston movable by the introduction of compressed air into the cylinder, a rod movable by the piston making engagement with say the compressor piston to move it outwards. When the operation of manoeuvring the piston assembly has been completed, the piston and rod of the manoeuvring gear are returned by a return spring, and the next operation consists in introducing a charge of compressed air into the air chamber of the starting gear and the final step consists in releasing the compressed air from the air chamber of the starting gear to the cushion space to bring about the starting stroke of the piston assembly. Thus the starting of such a free-piston machine involves a sequence of successive operations which must be carried out in correct order if an effective start is to be accomplished without risk of damage to the machine.

It is the object of the present invention to provide control equipment for use in conjunction with the starting equipment of a free-piston engine which ensures that the required starting operations must be carried out in the correct order.

In accordance with the invention starting control equipment is provided comprising a rotary member adapted to assume a plurality of predetermined angularly spaced positions about its axis of rotation, at least one of the succession of operations involved in starting the machine being initiated upon movement of said rotary member from each predetermined position to the next succeeding predetermined position, and means whereby said member is temporarily locked against movement from each one of said positions onwards to the next succeeding position until the corresponding operation or operations of the succession has or have been completed.

In order that the invention may be clearly understood and readily carried into effect it will now be described in more detail with reference to the accompanying drawing in which.

Figure 1:
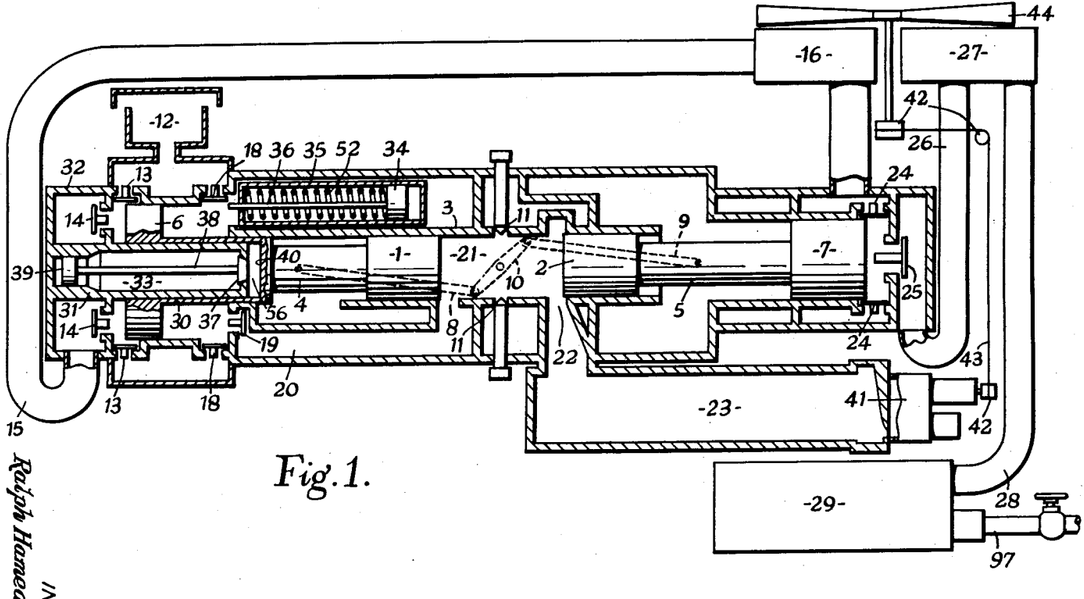
Figure 1 is a diagrammatic part-sectional view of an air compressor of the type to which the invention relates.

The engine shown in Figure 1 includes a pair of opposed free-pistons 1 and 2 movable in a common cylinder 3, and rigidly connected by piston rods 4 and 5 respectively to further pistons 6 and 7. The pistons 1 and 2 are interconnected by links 8 and 9 respectively to an oscillating lever 10, in order to ensure synchronism in their movements. Pistons 1 and 2 are motor pistons and are periodically forced outwardly away from one another by the combustion of fuel, introduced via injectors 11 into the highly compressed and hot air which is contained between the motor pistons at the end of the in stroke. Piston 6 is a low pressure piston, the inward movement of which draws air through filter 12 and spring-controlled valves 13 and expels it through spring-controlled valves 14 to a pipe 15 leading to an inter-cooler 16. Piston 6 also expels air through spring-controlled valve 19 to a duct 20 leading to the combustion space 21, so as to provide scavenging and combustion air, the combustion products being swept out of the combustion space via a port 22 to an exhaust box 23. Piston 7 is a high pressure piston which draws air from the inter-cooler 16, through spring-controlled valves 24, and expels it in a more highly compressed state through valve 25 to a pipe 26 leading to a cooler 27 from which the air passes via a pipe 28 to a compressed air reservoir 29. Piston rod 4 is hollow over a part 30 of its length, and a fixed hollow cylindrical body 31 projects from the end wall 32 of the low pressure stage into the said hollow part 30. During a normal power stroke of the engine air is compressed in the cushion space 56, and the energy stored in the cushion of compressed air thus produced effects the return stroke of the pistons 1 and 2 and thus compresses the air in the combustion space 21. When the engine is stationary the pistons 6 and 7 assume positions to the right and left respectively of the positions shown in Figure 1.

For the purpose of starting the engine, manoeuvring gear is provided comprising a piston 34 movable in a cylinder 35, and provided with a piston rod 36. A spring 52 is also provided which urges piston 34 to the right as seen in Figure 1. Starting gear, is also provided, comprising a valve 37 connected by a rod 38 to a piston 39 movable axially in a part of body 31 of reduced internal diameter. When it is desired to start the engine, compressed air is admitted through a port (not shown) to manoeuvring cylinder 35 at the right-hand side of piston 34 as seen in Figure 1, causing piston 34 to move to the left so that the free end of piston rod 36 engages piston 6, (which, it will be remembered, is to the right of the position shown) and moves it to the left to a position at or near the limit of its outward stroke as shown. When this operation has been completed, the air is released from cylinder 35, whereupon the piston 34 moves back to its right-hand position under the action of its spring, leaving the piston 6 in its left-hand position. Due to the interconnection of pistons 6 and 7 the piston 7 is now in its right-hand position as shown. When the above-described operation has been completed valve 37 is closed by admitting compressed air to the left-hand side of piston 39, and a charge of compressed air is admitted via a port (not shown) to starting air chamber 33. Valve 37 is then quickly opened by releasing the air from the left-hand side of piston 39, and the compressed air in chamber 33 is enabled to exert sudden pressure on the end surface 40 of the hollow part 30 of piston rod 4, thereby bringing about the starting stroke of the motor pistons 1 and 2. The exhaust gases fed to receiver 23 are employed for driving an exhaust turbine 41 which, through pulleys 42 and belt 43 drives a fan 44 associated with coolers 16 and 27.

Figure 2:
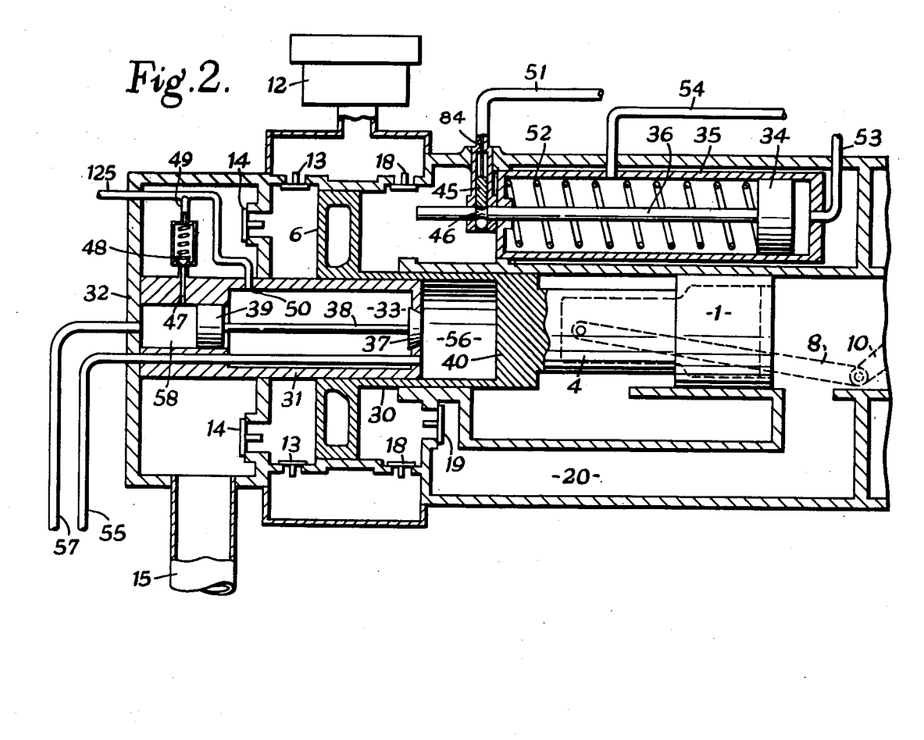
Figure 2 is a similar view, on a larger scale and in more detail, of part of an engine of the type illustrated in Fig. 1, showing modifications made for the purpose of applying the invention thereto.

The engine is to some extent shown diagrammatically in Figure 1, and the part view of Figure 2 shows it as modified in the following respects for the purpose of applying the invention to it.

An axially slidable locking pin 45 is adapted to be moved selectively to the operative position shown, in which it engages an annular groove 46 in piston rod 36 and thereby prevents the latter from moving to the left to entrain the piston 6, and to an inoperative position in which it is withdrawn from the said groove. The part of body 31 in which the piston 39 is slidable is formed with a port 47 controlled by a spring-loaded valve 48 and leading via a pipe 49 to a port 50 in the side wall of starting chamber 33. The locking pin 45 is provided with a Bowden control device 51 which will be referred to hereinafter. Figure 2 also shows the return spring 52 of piston 34. It also shows pipes 53 and 54 leading from cylinder 35, a pipe 55 leading from the cushion space 56, and a pipe 57 leading from the space 58 at the left-hand side of piston 39. In other respects Figure 2 is similar to the corresponding part of Figure 1, and the same reference numerals have been employed for similar parts in the two figures.

Figures 9, 12:
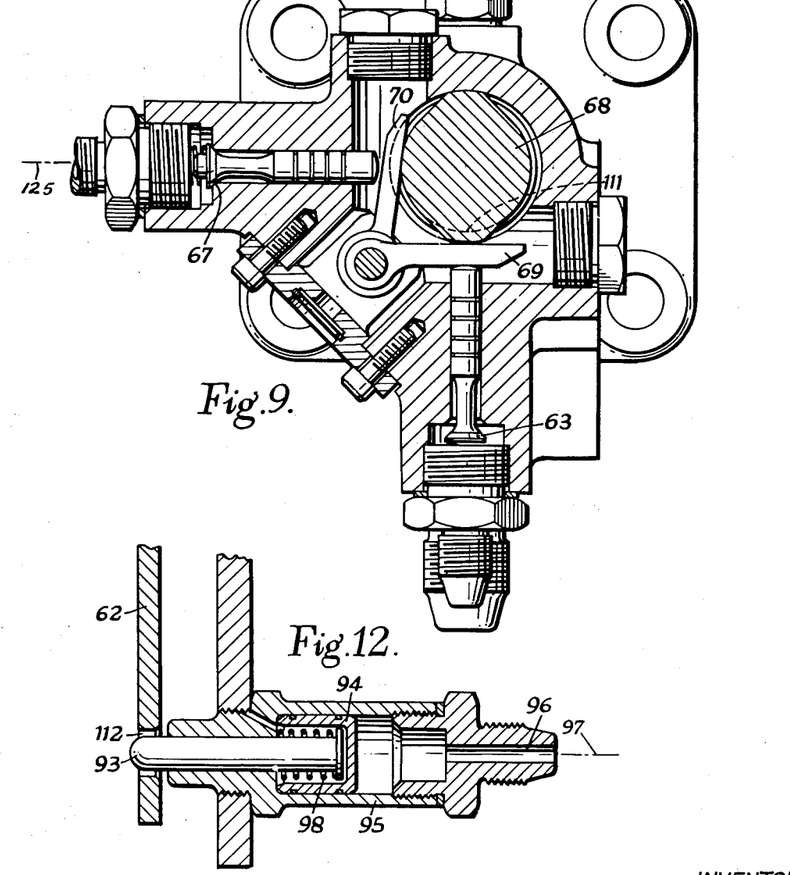
Figure 9 is a section on the line IX—IX of Figure 3 with the parts in the "charge starting chamber" position.
Figure 12 is a sectional view of a detail of the mechanism on a larger scale.
Figure 10:
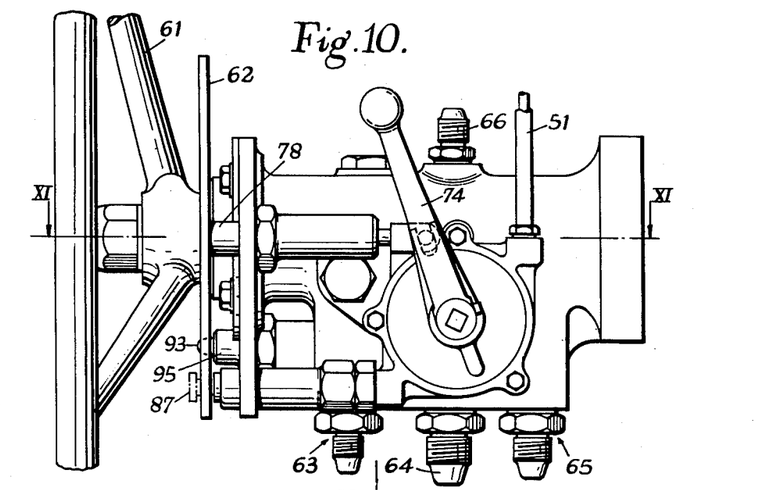
Figure 10 is a side view of the apparatus shown in Figure 3.
Figure 11:
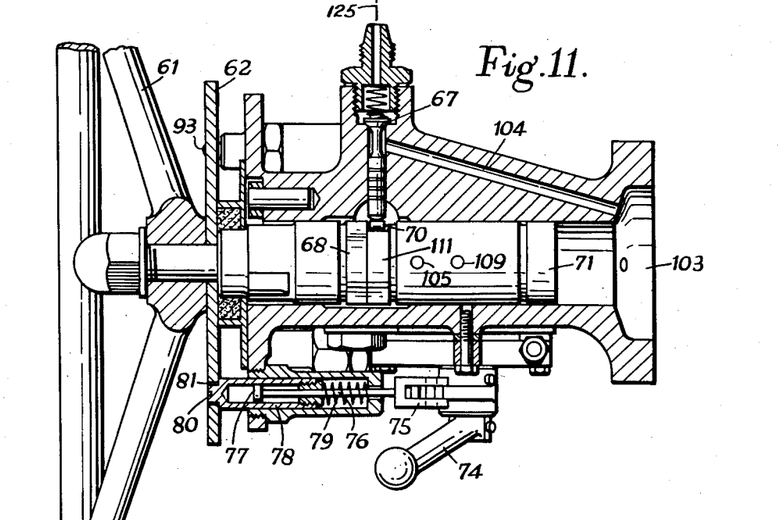
Figure 11 is a section on the line XI—XI of Figure 10.
Figures 13, 14:
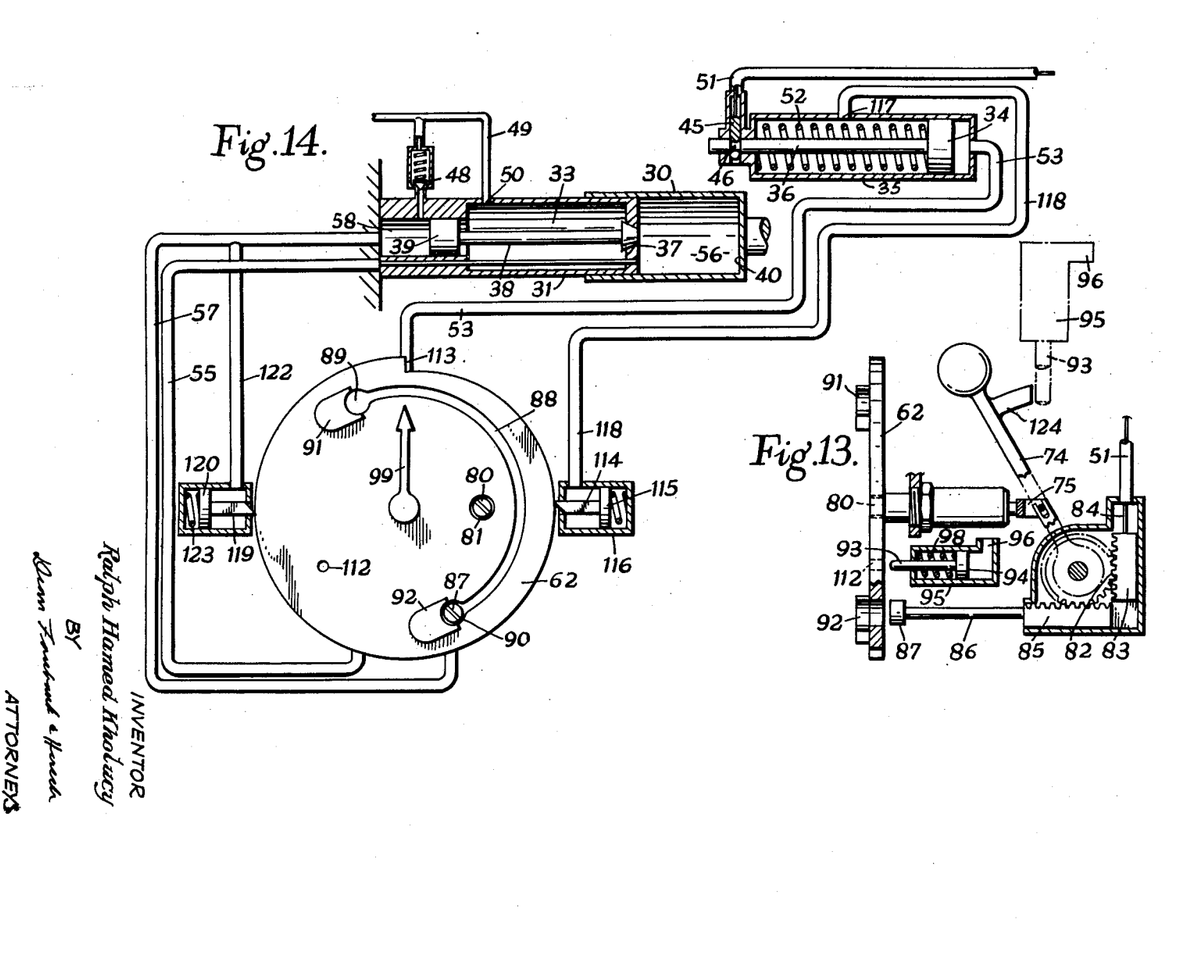
Figure 13 shows diagrammatically a two-position lever of the mechanism together with a side view of associated starting control element.
Figures 14 to 17 show diagrammatically the positions assumed by various elements of the control equipment in different positions of adjustment of the handwheel of the equipment, some of the detail of Figure 14 having been omitted from Figures 15 to 17, which are on a smaller scale than Figure 14.

The starting control equipment provided in accordance with the present invention (Figs. 3 to 12) includes a valve body 59 in which is disposed a rotatable spindle 60 provided with a handwheel 61. A locking plate 62 is rotatable with the spindle 60 and handwheel 61. The valve body 59 is provided with a spring-loaded valve 63 leading from a source of compressed air (not shown) a union 64 connected to pipe 57 leading to space 58 at the left-hand side of piston 39 (Fig. 2), a spring-loaded valve 65 (Figs. 4 to 7) which is connected via pipe 55 to the cushion space 56, a union 66 leading via pipe 53 to the right-hand side of piston 34, and with a spring-loaded valve 67 (Figs. 9 and 11) which is connected to the pipe 125 and chamber 33. The spindle 60 includes a cam portion 68 which (Figs. 9 and 11) controls valve 63 through the intermediary of a cam follower 69. Another cam portion 111 on the spindle, adjacent to cam portion 68 (Fig. 11) controls valve 67 through the intermediary of cam follower 70. The spindle also includes a cam portion 71 which controls valve 65 directly. The handwheel 61 is rotatable in a clockwise direction looking from the left-hand side of Figure 3 and on the spindle 60 is provided a ratchet 72 with which co-operates a spring loaded pawl 73 (Fig. 8) which serves to prevent reversal of the direction of rotation of handwheel 61 for at least the major part of the revolution of the handwheel. On valve body 59 is mounted a two-position lever 74 connected by the control device 51 to the locking pin 45, the Bowden control device 51 being capable of inserting the pin 45 into, and withdrawing it from, the groove 46. The lever 74 is also connected by a link 75 (Fig. 11) to a guide rod 76 with an enlarged head 77 slidable in a cylinder formed by a hollow portion of an axially slidable locking pin 78 which in the position of lever 74 shown in Figures 10, 11 and 13 is urged to the left by a spring 79 so that its end 80, which is of smaller external diameter than the major part, projects into an aperture 81 in the locking plate 62. The coupling between the lever 74 and the Bowden control device 51 comprises (Fig. 13) a pinion 82 on the shaft on which lever 74 is mounted, and a rack 83 to which the cable 84 of the Bowden control device is connected. A further rack 85 in engagement with pinion 82 carries an axially movable locking pin 86 having an enlarged head 87. Locking plate 62 is formed (Fig. 14) with a semi-circular slot 88 which is of uniform width with the exception of the enlarged nearly circular ends 89 and 90 which are of a size to admit the head 87 of the locking pin 86.

Figure 3:
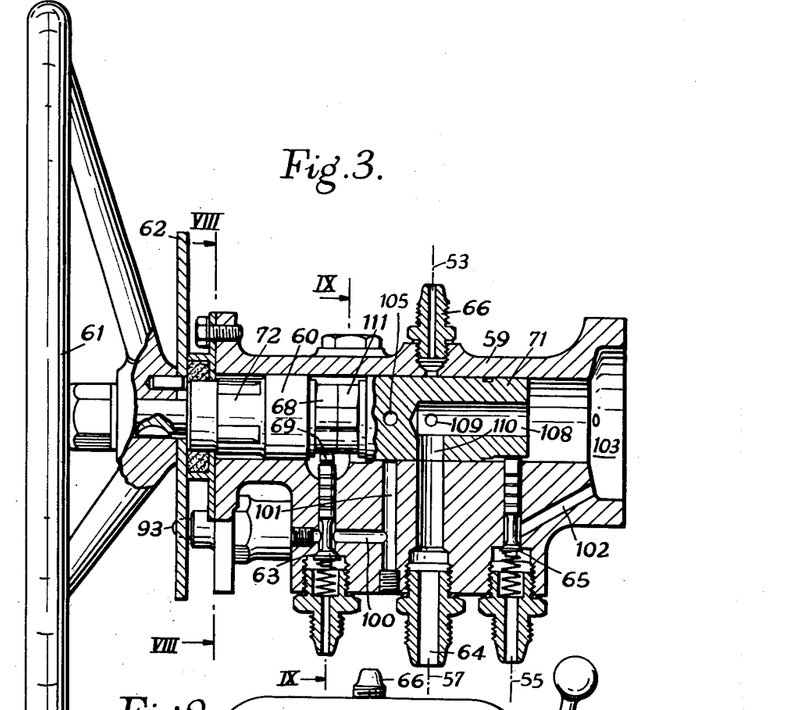
Figure 3 is a view in sectional elevation of valve mechanism incorporated in control equipment according to the invention, showing the valve mechanism in the "start and run" or "vent starting chamber" position.
Figure 3A:
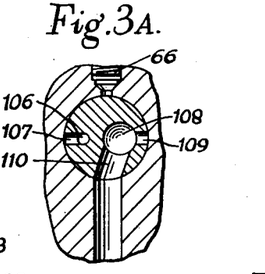
Figures 3A, 4A, 5A and 6A are cross-sectional views showing on a larger scale the positions of the ports and passages corresponding to Figures 3, 4, 5 and 6 respectively.
Figure 4:
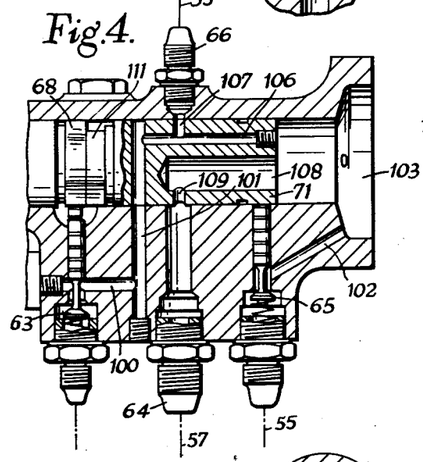
Figure 4 is a view in sectional elevation of the valve mechanism showing it in the "charge manoeuvring cylinder" position.
Figure 4A:
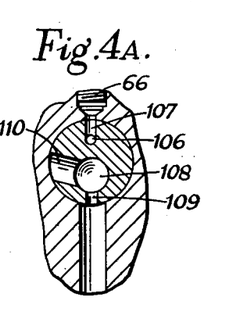

Adjacent to the ends of slot 88 are provided shaped guide blocks 91 and 92 respectively. The diameter of pin 86 is such that the locking plate 62 is freely rotatable with the pin 86 engaged in the slot 88. The head 87 of pin 86 is capable of passing through the enlarged ends 89 and 90 of the slot 88 but not through the part of the slot between these enlarged ends. An additional locking pin 93 (Fig. 12) is carried by a piston 94 movable in a cylinder 95 which is connected by a union 96 and pipe 97 to the main air receiver 29 (Fig. 1). A spring 98 urges pin 93 to the right as seen in Figures 3 and 12, away from plate 62. When compressed air is supplied to cylinder 95 the pin 93 moves to the left and can project into the hole 112 in the locking plate 62 when the latter is in an appropriate position.

The locking plate 62 is provided with an indicator formed by an arrow 99, which in the example illustrated is arranged to point vertically upwards (Fig. 14) when the engine is running or has been stopped. While the engine is running the pin 80 engages with the hole 81 in the locking plate 62 and thereby prevents movement of handwheel 61.

Valve body 59 is formed with a passage 100 leading from valve 53 to a port 101, a passage 102 leading from valve 65 to an exhaust opening 103, and a passage 104 leading from valve 67 (Fig. 11) to the exhaust opening 103. The spindle 60 is formed with a transverse passage 105 (Fig. 5) connected by a passage 106 to a port 107, and a cavity 108 which is open to the exhaust opening 103 and communicates with ports 109 and 110.

The operation of the apparatus as so far described is as follows:

The parts are assumed to be initially in the positions illustrated diagrammatically in Figures 13 and 14.

When it is desired to start the engine, the first step required is the operation of the manoeuvring gear comprising piston rod 36. For this purpose, lever 74 is moved away from the handwheel 61, i. e. in clockwise direction as seen in Figure 10, and this has the effect of withdrawing the locking pin 45 from the annular groove 46 in the piston rod 36 and at the same time it causes the head 87 of the locking pin 86 to pass through the enlarged end 90 of the slot 88 in the locking plate 62, whereby to restrict the angle of rotation of handwheel 61. The movement of lever 74 also causes the disengagement of the stop formed by locking pin 80 from the hole 81 in the locking plate 62 so that the handwheel 61 can be turned, subject to the limitation on the degree of its rotation imposed by the locking pin 86.

Figure 15:
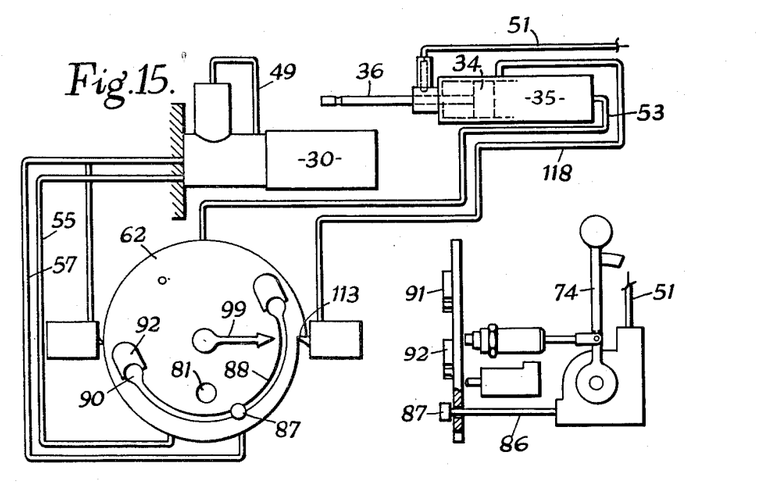

The handwheel 61 is then turned in a clockwise direction as seen in Figure 14 through a quarter of a turn, so that the arrow 99 on the locking plate 62 now points horizontally to the right (Fig. 15). With the handwheel 61 in this position, the cam 68 on the spindle 60 presses rocker arm 69 so as to open the valve 63 against the action of its spring (see Fig. 4) so that air is fed to the manoeuvring cylinder 35 from said source via valve 63, passage 100, port 101, passage 105 and 106, port 107 and union 66. At the same time cam 71 moves valve 65 from its seat (Fig. 4) against the pressure of its spring so as to exhaust air from the cushion space 56, and thereby avoid back pressure as the compressor piston 6 moves outwards under the pressure of piston rod 36, the air from the cushion space 56 being vented via pipe 55, valve 65, passage 102 and exhaust opening 103. This may be termed the "charge manoeuvring cylinder" position of handwheel 61.

Figure 16:
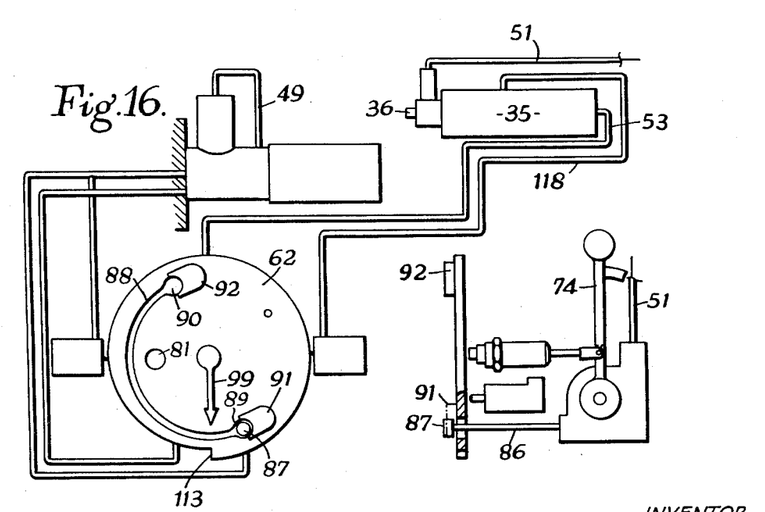

The handwheel 61 is then turned through a further quarter turn so that the arrow 99 on the locking plate 62 points vertically downwards (Figure 16). The resultant movement of the spindle 60 moves the cam 68 (Fig. 6) to allow valve 63 to close, and permits air to exhaust from the manoeuvring cylinder 35 via nozzle 66, port 110 and cavity 108 (Fig. 6A) so that the manoeuvring piston 34 and piston rod 36 can be returned by the spring 52. In this position of spindle 60, cam 111 presses rocker arm 70 so as to open the valve 67 against the action of its spring, to vent chamber 33 via pipe 125, valve 67, passage 104 and exhaust opening 103. The block 91 at the end 89 of the slot 88 in the locking plate 62 will now be in engagement with the head 87 of the locking pin or stop 86, thereby preventing further rotation of the handwheel 61. This may be termed the "vent manoeuvring cylinder" position of handwheel.

Figures 5, 5A:
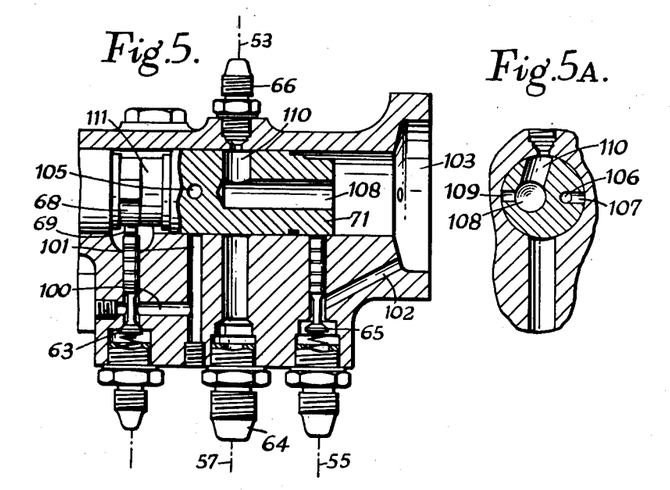
Figure 5 is a view in sectional elevation of the valve mechanism showing it in the "vent manoeuvring cylinder" position.
Figures 6, 6A:
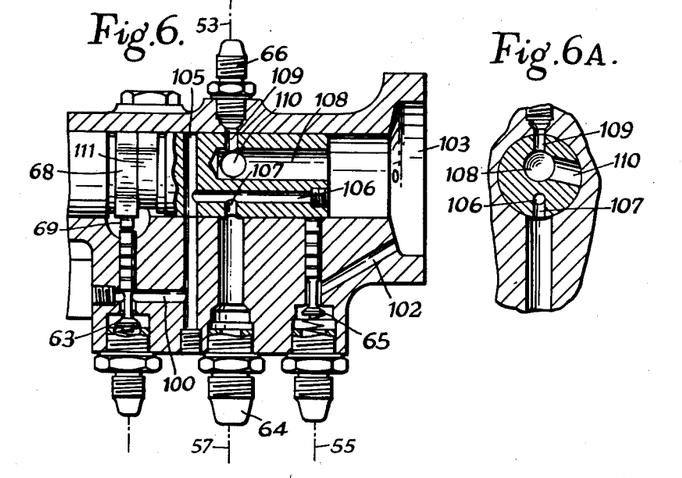
Figure 6 is a view in sectional elevation of the valve mechanism showing it in the "charge starting chamber" position.
Figure 7:
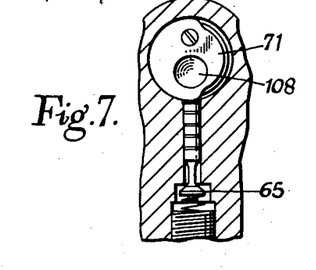
Figure 7 is an end view of a cam of the valve mechanism, the latter being in the "charge manoeuvring cylinder" position.
Figure 17:
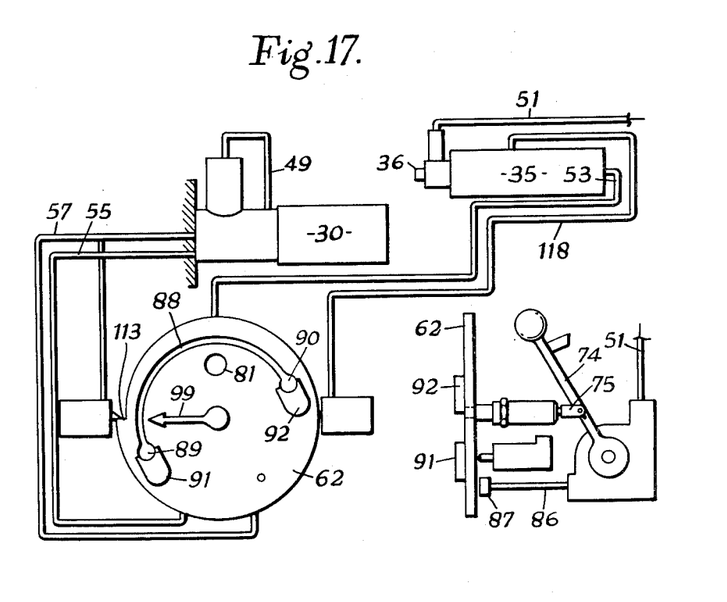

The next step is charging of the starting gear. For this purpose lever 74 is moved towards the handwheel 61. This can only be effected when the manoeuvring gear piston 34 has returned to the position shown in Figure 14 under the action of its spring 52 since until this has occurred, the locking pin 45 cannot enter the groove in the piston rod 36. On the other hand, when lever 74 has been moved towards the handwheel 61 and the piston rod 36 has become locked by the locking pin 45, the stop or locking pin 86 will be wholly withdrawn from the locking plate 62 so that the handwheel 61 can now be moved further in the same direction as previously. The handwheel is now turned through a further quarter turn so that the arrow 99 points horizontally to the left (Figure 17). The cam 68 on the spindle 60 now causes the valve 63 to open to effect the supply of compressed air to the starting chamber 33 via passage 100, port 101, passage 105, passage 106, port 107, union 64 and pipe 57 (Figs. 5 and 5A). The handwheel 61 is left in this position for a sufficient time to enable the air pressure in starting chamber 33 to build up to a suitable value, via space 58, port 47, valve 48, pipe 49 and port 50 (Fig. 2). This may be termed the "change starting chamber" position of handwheel 61.

The handwheel 61 is then turned through a further quarter turn so the arrow 99 points vertically upwards (Fig. 14). The handwheel will by now have completed one revolution from its initial position. With the handwheel in this position the cam 68 permits valve 63 to close and the air is rapidly exhausted from space 58 via pipe 57, union 64, port 110 and cavity 108. Valve 48 immediately closes, and as soon as the pressure in space 58 has fallen sufficiently the compressed air in starting chamber 33 urges the piston 39 to the left (Fig. 2) since the area of piston 39 exposed to the pressure in chamber 33 is greater than the effective area of valve 37, as clearly shown in Fig. 14, thereby moving valve 37 from its seat and permitting compressed air to pass rapidly from chamber 33 into the cushion space 56. The pressure of this air on the end face 40 of the hollow part 30 of piston rod 4 causes the pistons 1 and 2 to move towards one another to effect the initial compression or starting stroke. This may be termed the "start and run" position of handwheel 61.

When the handwheel is moved to the last-mentioned position the stop or locking pin 80, which since the last movement of lever 74 towards the locking plate 62 has been pressed by its spring 79 against the locking plate 62 is caused to enter the hole 81 and thereby prevent further movement of the handwheel 61, until the lever 74 is again moved away from the locking plate, for the purpose of carrying out a further starting sequence. If lever 74 is moved while the engine is running the handwheel 61 cannot be moved because as soon as pressure begins to build up in the receiver 29 compressed air is fed therefrom to cylinder 95, and the stop or locking pin 93 is moved outwardly against the action of its spring. In the arrangement of Figure 3 the locking pin 93, under these conditions, enters a hole in the locking plate. This hole is shown at 112 in Figure 12. At the lower part of Figure 13 the cylinder 95 is shown in a position corresponding to the arrangement of Figure 3. It may however be arranged as shown in the upper part of Figure 13, for a purpose which is mentioned hereinafter.

Figure 8:
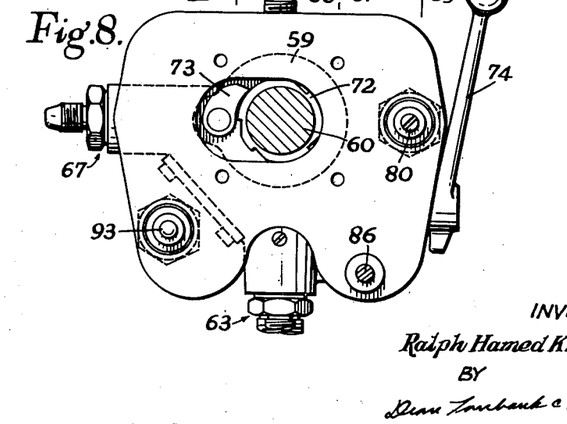
Figure 8 is a part section on the line VIII—VIII of Figure 3.

The pawl and ratchet mechanism 72, 73 serves to prevent the handwheel 61 from being rotated backwards when in the three positions corresponding to charging of the manoeuvring cylinder 35, venting of the manoeuvring cylinder, and venting of the starting chamber 33 to cushion space 56. As shown in Figure 8, the ratchet 72 has no teeth around one quarter of its periphery, whereby it is possible for the handwheel 61 to be turned backwards from the position corresponding to charging of the starting chamber to "vent manoeuvring cylinder" position of handwheel 61 if in an emergency it should be necessary to vent the space 58. In this position, with the arrow 99 pointing downwards, cam portion 111 on spindle 60 opens valve 67 to release the air from chamber 33, via pipe 125, valve 67, passage 104, and exhaust opening 103.

In the absence of the enlarged head 87 on stop or locking pin 86, the manoeuvring cylinder 35 could be charged with air with the locking pin 45 in its locking position, and this could cause the pin 45 to be damaged. However, the pin 45 can only be caused to enter its groove when the lever 74 is capable of moving from its right-hand to its left-hand position (Fig. 13), and this can only occur when the enlarged head 87 of locking pin 86 can pass through one or other of the holes 89, 90 in the locking plate 62, i. e. when the locking plate 62 is in one or other of the positions corresponding respectively to "start and run" and "vent starting chamber".

With the apparatus as so far described, the handwheel 61 can be turned prematurely from "charge manoeuvring cylinder" position (Fig. 15) to "vent manoeuvring cylinder" position (Fig. 16) before the parts are in the appropriate positions for starting, and this may lead to damage. In order to avoid this risk, the locking plate 62 is formed (Figs. 14 to 17) with a notch 113, and a movable stop is provided in the form of a locking pin 114 carried by a spring-loaded piston 115 movable in a cylinder 116. The locking pin 114 tends to project into the path of notch 113 so as to prevent rotation of the locking plate 62 beyond the "charge manoeuvring cylinder" position (Fig 15). However, when the manoeuvring piston 35 has moved sufficiently far to bring the pistons 1 and 2 into starting position, it has then moved beyond a port 117 which communicates via a pipe 118 with cylinder 116. Compressed air is thereby fed from cylinder 35 to cylinder 116 so that the piston 115 is moved against the action of its spring and the locking pin 114 is thereby moved out of the path of the notch 113, so that the handwheel 61 can be turned to the position shown in Fig. 16.

It is also possible, with the apparatus so far described, to move the handwheel 61 quickly from the "vent manoeuvring cylinder" position to the "vent starting chamber" position (Fig. 14) without dwelling at the "charge starting chamber" position (Fig. 17), or before the chamber 33 is fully charged, in which case the motor pistons 1 and 2 may execute too long a working stroke due to the inadequacy of the air pressure in cushion space 56. In order to avoid these possibilities a movable stop is provided (Fig. 14) in the form of a pin 119 carried by a spring-pressed piston 120 movable in a cylinder 121. Cylinder 121 communicates via a pipe 122 with the pipe 57 and the strength of the spring 123 is such that until the starting cylinder 31 is fully charged the pressure on piston 120 is insufficient to move it against the action of spring 123, so that the pin 119 projects into the path of notch 113 (Figure 17). When the pressure in the cylinder 31 reaches the appropriate value the pin 119 is withdrawn from the path of notch 113, so that the handwheel can be turned to the position corresponding to Figure 14.

The cam 71 on spindle 60 is shaped so that valve 65 is open when the handwheel 61 is in "charge manoeuvring cylinder" position and remains open until the handwheel moves slightly beyond "charge starting chamber" position. This ensures the venting to exhaust, via pipe 55, of any air which leaks into the cushion space 56 during charging of the starting chamber 33 and avoids premature movement of the motor pistons 1 and 2 towards one another.

A relief valve (not shown) may be provided for preventing the air pressure in cylinder 31 from exceeding a predetermined value. The escape of air via this relief valve warns the operator that air is being wasted and that the apparatus is suitably conditioned for starting the engine. Alternatively, means may be provided whereby the handwheel 61 is automatically turned to the "start and run" position as soon as a predetermined air pressure obtains in the space 58 or chamber 33.

If desired cylinder 95 may be disposed as shown in the upper part of Figure 13, so that when compressed air begins to accumulate in the receiver 29 the stop or locking pin 93 is moved into the path of an arm 124 on lever 74, thereby preventing movement of lever 74 while the engine is running.

I claim:

1. Starting control equipment for a free-piston type internal combustion machine, said equipment comprising a rotary member adapted to assume a plurality of predetermined angularly spaced positions about its axis of rotation, at least one of the succession of operations involved in starting the machine being initiated upon movement of said rotary member from each predetermined position to the next succeeding predetermined position, and means whereby said member is temporarily locked against movement from each one of said positions onwards to the next succeeding position until the corresponding operation of the succession has been completed, and whereby said member is released in response to the completion of said operation.

2. Starting control equipment as set forth in claim 1, wherein said rotary member has a first angular position in which it establishes communication between a source of compressed air and a manoeuvring cylinder provided in the machine whereby to charge said cylinder, and wherein a first movable stop is provided which is biased to a position in which it prevents movement of said rotary member to the next succeeding position of said member, said stop being arranged to be moved from its said position in response to the piston of said manoeuvring cylinder assuming a predetermined position.

3. Starting control equipment for a free-piston type internal combustion machine, said equipment comprising a rotary member adapted to assume a plurality of predetermined angularly spaced positions about its axis of rotation, at least one of the succession of operations involved in starting the machine being initiated upon movement of said rotary member from each predetermined position to the next succeeding predetermined position, means whereby said member is temporarily locked against movement from each one of said positions onwards to the next succeeding position until the corresponding operation of the succession has been completed, and whereby said member is released in response to the completion of said operation, said rotary member having a first angular position in which it establishes communication between a source of compressed air and a manoeuvring cylinder provided in the machine whereby to charge said cylinder, a first movable stop biased to a position in which it prevents movement of said rotary member to the next succeeding position of said member, said stop being arranged to be moved from its said position in response to the piston of said manoeuvring cylinder assuming a predetermined position, said rotary member having a second angular position which is subsequent to that in which the manoeuvring cylinder is charged, in which second position said member effects venting of said manoeuvring cylinder, and a second movable stop interconnected with an operable detent for the piston of said manoeuvring cylinder in such manner that when said piston is freed from its detent said stop prevents movement of said rotary member beyond said second position, and when said detent is operated to lock the piston of said manoeuvring cylinder said stop is moved to a position in which it permits movement of said rotary member beyond said second position.

4. Starting control equipment as set forth in claim 3, wherein said rotary member has a third position which is subsequent to that in which the manoeuvring cylinder is vented, in which third position it effects charging of a starting chamber provided in the machine, and wherein a third movable stop is provided which is biased to a position in which it prevents movement of said rotary member beyond said third position, and which is adapted to move to a position in which it permits movement of said rotary member beyond said third position in response to the pressure in said starting chamber attaining a predetermined value.

5. Starting control equipment for a free-piston type internal combustion machine, said equipment comprising a rotary member adapted to assume a plurality of predetermined angularly spaced positions about its axis of rotation, at least one of the succession of operations involved in starting the machine being initiated upon movement of said rotary member from each predetermined position to the next succeeding predetermined position, means whereby said member is temporarily locked against movement from each one of said positions onwards to the next succeeding position until the corresponding operation of the succession has been completed, and whereby said member is released in response to the completion of said operation, said rotary member having a first angular position in which it establishes communication between a source of compressed air and a manoeuvring cylinder provided in the machine whereby to charge said cylinder, a first movable stop biased to a position in which it prevents movement of said rotary member to the next succeeding position of said member, said stop being arranged to be moved from its said position in response to the piston of said manoeuvring cylinder assuming a predetermined position, said rotary member having a second angular position which is subsequent to that in which the manoeuvring cylinder is charged, in which second position said member effects venting of said manoeuvring cylinder, a second movable stop interconnected with an operable detent for the piston of said manoeuvring cylinder in such manner that when said piston is freed from its detent said stop prevents movement of said rotary member beyond said second position, and when said detent is operated to lock the piston of said manoeuvring cylinder said stop is moved to a position in which it permits movement of said rotary member beyond said second position, said rotary member having a third position which is subsequent to that in which the manoeuvring cylinder is vented, in which third position it effects charging of a starting chamber provided in the machine, a third movable stop biased to a position in which it prevents movement of said rotary member beyond said third position and which stop is adapted to move to a position in which it permits movement of said rotary member beyond said third position in response to the pressure in said starting chamber attaining a predetermined value, said rotary member having a fourth position which is subsequent to that in which the starting chamber is charged, in which fourth position it effects venting of the starting chamber for effecting the starting stroke of the machine, and a fourth movable stop which while the machine is running prevents said rotary member from being moved from said fourth to said first position, said stop being subject on the one hand to a biasing force which tends to move it to an inoperative position and on the other hand to the pressure of compressed air delivered by the machine.

6. Starting control equipment for a free-piston type internal combustion machine provided with a manoeuvring cylinder and a starting chamber, said equipment comprising a rotary member adapted to assume a plurality of predetermined angularly spaced positions which include a first position in which it effects charging of said manoeuvring cylinder, a second position in which it effects venting of said manoeuvring cylinder, a third position in which it effects charging of said starting cylinder, and a fourth position in which it effects venting of said starting cylinder to effect the starting stroke of the machine, the equipment comprising first locking means for preventing movement of said member from said first to said second position, and releasable in response to the piston of said manoeuvring cylinder assuming a predetermined operative position, second locking means for preventing movement of said member from said second to said third position and releasable in response to said piston being locked in an inoperative position, and third locking means for preventing movement of said member from said third position to said fourth position and releasable in response to the pressure in said starting chamber attaining a predetermined value.

7. Starting control equipment as set forth in claim 6, comprising fourth locking means for preventing movement of said member from said fourth position and releasable in response to the piston of said manoeuvring cylinder being unlocked.

8. Starting control equipment for a free-piston type internal combustion machine provided with a manoeuvring cylinder and a starting chamber, said equipment comprising a rotary member adapted to assume a plurality of predetermined angularly spaced positions which include a first position in which it effects charging of said manoeuvring cylinder, a second position in which it effects venting of said manoeuvring cylinder, a third position in which it effects charging of said starting cylinder, and a fourth position in which it effects venting of said starting cylinder to effect the starting stroke of the machine, the equipment comprising first locking means for preventing movement of said member from said first to said second position, and releasable in response to the piston of said manoeuvring cylinder assuming a predetermined operative position, second locking means for preventing movement of said member from said second to said third position and releasable in response to said piston being locked in an inoperative position, third locking means for preventing movement of said member from said third position to said fourth position and releasable in response to the pressure in said starting chamber attaining a predetermined value, fourth locking means for preventing movement of said member from said fourth position and releasable in response to the piston of said manoeuvring cylinder being unlocked, and fifth locking means operative during and in response to running of the machine to prevent movement of said member from said fourth position to said first position, independently of the condition of said fourth locking means.

9. Starting control equipment for a free-piston type internal combustion machine provided with a manoeuvring cylinder and a starting chamber, said equipment comprising a rotary member adapted to assume a plurality of angularly spaced positions about its axis of rotation, said positions including a first position in which said member establishes communication between a source of compressed air and said manoeuvring cylinder, a second position in which said member effects venting of said manoeuvring cylinder, a third position in which said member effects charging of said starting chamber, and a fourth position in which it effects venting of said starting chamber to effect the starting stroke of said machine, the equipment further comprising a locking plate which is rotatable with said member, and which is formed with a notch, and with an arcuate slot which has enlarged ends, a first movable stop, means biasing said first movable stop into the path of said notch whereby to prevent movement of said rotary member from said first to said second position, means for removing said first movable stop out of the path of said notch in response to the piston of said manoeuvring cylinder assuming a predetermined operative position, a lever operable alternatively to lock the piston of said manoeuvring cylinder in an inoperative position and to release said piston, a second movable stop comprising a locking pin said locking pin being coupled to said lever whereby said locking pin projects through said slot, when said piston is unlocked, to prevent movement of said rotary member from said second position to said third position, and said locking pin having an enlarged head capable of passing through the enlarged ends of said slot, and said enlarged ends of the slot being positioned to register with said head when said rotary member is in the said second or fourth position respectively, and said enlarged head preventing withdrawal of said pin from said slot when said rotary member is between its fourth and second positions, engagement of said locking pin with said slot corresponding to the locking position of said lever and vice versa, the equipment further comprising a third movable stop, means for biasing said third movable stop into the path of said notch, and means responsive to the attainment of a predetermined pressure in said starting chamber to remove said third movable stop from the path of said notch.

10. Starting control equipment as set forth in claim 9, comprising a further locking pin, means for biasing said further locking pin towards said locking plate, which has a hole positioned to receive said further locking pin when said rotary control member is in the said fourth position, and means coupling said further locking pin to said lever whereby said pin is withdrawn from said hole when said lever is operated to release the piston of said manoeuvring cylinder.

11. Starting control mechanism as set forth in claim 9, for an air compressor, the equipment comprising an additional locking pin, means biasing said additional locking pin away from said locking plate, which has a further hole positioned to receive said additional locking pin when said rotary member is in its said fourth position, and means responsive to the pressure of compressed air delivered by said air compressor to urge said additional locking pin towards said locking plate.

12. Starting control mechanism as set forth in claim 9, for an air compressor comprising a fourth stop movable into and out of the path of said lever, means biasing said fourth stop out of the path of said lever, and means responsive to the pressure of compressed air delivered by said compressor to move said fourth stop into the path of said lever.

13. Starting control mechanism as set forth in claim 9, comprising pawl and ratchet mechanism associated with said rotary member said mechanism serving to prevent backward rotation of said rotary member when said member is in any one of its said first, second and fourth positions.

References Cited in the file of this patent

FOREIGN PATENTS 570,831    Great Britain  \_\_\_\_\_\_\_\_\_\_\_ July 24, 1945